(12) United States Patent
Thomas et al.

(10) Patent No.: US 8,213,408 B1
(45) Date of Patent: Jul. 3, 2012

(54) PROVIDING SECURITY IN A MULTIMEDIA NETWORK

(75) Inventors: Michael Flynn Thomas, Plano, TX (US); Robert Elwood Denman, Plano, TX (US); Sriram Parameswar, Snoqualmie, WA (US)

(73) Assignee: Genband US LLC, Plano, TX (US)

( * ) Notice: Subject to any disclaimer, the term of this patent is extended or adjusted under 35 U.S.C. 154(b) by 959 days.

(21) Appl. No.: 11/522,732

(22) Filed: Sep. 18, 2006

Related U.S. Application Data (60) Provisional application No. 60/717,966, filed on Sep. 16, 2005.

(51) Int. Cl.
*H04L 12/28* (2006.01)
(52) U.S. Cl. .................................. 370/351; 370/252
(58) Field of Classification Search .................. 370/252, 370/351; 709/225, 223, 224; 726/3
See application file for complete search history.

(56) References Cited

U.S. PATENT DOCUMENTS

| | | | |
|---|---|---|---|
| 6,629,150 B1 | 9/2003 | Huded | |
| 8,054,761 B2 | 11/2011 | Thomas et al. | |
| 2002/0144110 A1 | 10/2002 | Ramanathan | |
| 2002/0144120 A1 | 10/2002 | Ramanathan | |
| 2004/0177145 A1* | 9/2004 | Bajko | 709/225 |
| 2005/0068935 A1* | 3/2005 | Bajko et al. | 370/351 |
| 2007/0100981 A1* | 5/2007 | Adamczyk et al. | 709/223 |
| 2007/0209061 A1* | 9/2007 | Dekeyzer et al. | 726/3 |
| 2007/0277035 A1 | 11/2007 | Patel et al. | |
| 2008/0046745 A1 | 2/2008 | Buch et al. | |
| 2008/0062984 A1 | 3/2008 | Emeott et al. | |
| 2008/0083022 A1 | 4/2008 | Lee et al. | |
| 2011/0072261 A1 | 3/2011 | Thomas et al. | |

OTHER PUBLICATIONS

Commonly-assigned, co-pending U.S. Appl. No. 12/950,735 for "Providing Security Between Network Elements in a Network," (Unpublished, filed Nov. 19, 2010).
"3rd Generation Partnership Project; Technical Specification Group Services and Systems Aspects; Network Architecture (Release 7)," 3GPP TS 23.002, V7.1.0, pp. 1-62 (Mar. 2006).
Handley et al., "SDP: Session Description Protocol," RFC 4566, pp. 1-50 (Jul. 2006).
"3rd Generation Partnership Project; Technical Specification Group Services and System Aspects; IP Multimedia Subsystem (IMS); Stage 2 (Release 7)," 3GPP TS 23.228, V7.4.0, pp. 1-197 (Jun. 2006).
Kaufman, "Internet Key Exchange (IKEv2) Protocol," RFC 4306, pp. 1-100 (Dec. 2005).
Kent, "IP Encapsulating Security Payload (ESP)," RFC 4303, pp. 1-45 (Dec. 2005).
Kent, "IP Authentication Header," RFC 4302, pp. 1-35 (Dec. 2005).
Kent et al., "Security Architecture for the Internet Protocol," RFC 4301, pp. 1-102 (Dec. 2005).

(Continued)

*Primary Examiner* — Albert T Chou
(74) *Attorney, Agent, or Firm* — Jenkins, Wilson, Taylor & Hunt, P.A.

(57) ABSTRACT

A first control node for use in a multimedia network includes a call control module to perform a call control task to enable establishment of a call session on behalf of a terminal in the multimedia network. The call control module further cooperates with a second control node to perform the call control task. A security element performs a security task with respect to messaging communicated for enabling establishment of the call session.

18 Claims, 7 Drawing Sheets

OTHER PUBLICATIONS

"3rd Generation Partnership Project; Technical Specification Group Services and System Aspects; 3G Security; Access Security for IP-based Services (Release 6)," 3GPP TS 33.203, V6.9.0 (Dec. 2005).

Arends et al., "Protocol Modifications for the DNS Security Extensions," RFC 4035, pp. 1-54 (Mar. 2005).

Huttunen et al, "UDP Encapsulation of IPsec ESP Packets," RFC 3948, pp. 1-16 (Jan. 2005).

"3rd Generation Partnership Project; Technical Specification Group Services and System Aspects; Network Domain Security (NDS); Authentication Framework (AF) (Release 6)," 3GPP TS 33.310, V6.2.0, pp. 1-29 (Sep. 2004).

Housley, "Cryptographic Message Syntax (CMS)," RFC 3852, pp. 1-56 (Jul. 2004).

"IMS Security Framework," 3GPP2, S.R0086-A, Version: 1.0, pp. 1-39 (Jun. 10, 2004).

"3rd Generation Partnership Project; Technical Specification Group Services and System Aspects; 3G Security; Network Domain Security; IP Network Layer Security (Release 6)," 3GPP TS 33.210, V6.5.0, pp. 1-21 (Jun. 2004).

Arkko et al., "Security Mechanism Agreement for the Session Initiation Protocol (SIP)," RFC 3329, pp. 1-23 (Jan. 2003).

Rosenberg et al., "SIP: Session Initiation Protocol," RFC 3261, pp. 1-270 (Jun. 2002).

Deering et al., "Internet Protocol, Version 6, (IPv6) Specification," RFC 2460 pp. 1-40 (Dec. 1998).

Kille, "A String Representation of Distinguished Names," RFC 1779, pp. 1-8 (Mar. 1995).

"Internet Protocol," RFC 791, pp. 1-49 (Sep. 1981).

Non-Final Official Action for U.S. Appl. No. 12/950,735 (Jul. 15, 2011).

Notice of Allowance and Fee(s) Due for U.S. Appl. No. 12/950,735 (Aug. 25, 2011).

* cited by examiner

PROVIDING SECURITY IN A MULTIMEDIA NETWORK

CROSS-REFERENCE TO RELATED APPLICATION

This claims the benefit under 35 U.S.C. §119(e) of U.S. Provisional Application Ser. No. 60/717,966, entitled "Enhanced Security for a Multimedia Domain (MMD) Network with Home and Visited Network Service Control," filed Sep. 16, 2005, which is hereby incorporated by reference.

TECHNICAL FIELD

The invention relates generally to providing security in a multimedia network.

BACKGROUND

Many types of communications can be performed over data networks (wireless and/or wireline networks), including electronic mail, web browsing, file downloads, electronic commerce transactions, voice or other forms of real-time, interactive communications, and others. To enable the establishment of communications sessions in a network, various control functions are deployed in the network. Some standards bodies have defined subsystems within communications networks that include such control functions. One such standards body is the Third Generation Partnership Project (3GPP), which has defined an Internet protocol (IP) multimedia subsystem (IMS) that includes various control functions for provision of IP multimedia services, including audio, video, text, chat, or any combination of the foregoing.

An IP multimedia subsystem can be used in conjunction with a wireless network, such as wireless networks according to the GSM (Global System for Mobile) or UMTS (Universal Mobile Telecommunications System) standards, as defined by 3GPP, or wireless networks according to CDMA 2000 (Code Division Multiple Access 2000), as defined by 3GPP2. An IP multimedia subsystem can also be used with wireline networks. In the 3GPP2 context, the equivalent of the IP multimedia subsystem is sometimes referred to as a multimedia domain (MMD) network. In the wireline context, the equivalent of an IP multimedia subsystem is sometimes referred to as a Next Generation Networks (NGN). The term "multimedia network" is used to generically refer to any one of an IP multimedia subsystem, MMD network, NGN, or to any other network in which multimedia communications (any one or more of video, audio, text, chat, e-mail, web browsing, etc.) are possible.

An issue associated with conventional multimedia networks is the adequacy of security. Generally, standards bodies have not adequately defined procedures and mechanisms to provide comprehensive security within multimedia networks.

SUMMARY

In general, according to an embodiment, a control node is provided for use in a multimedia network, where the control node includes a call control module to perform a call control task to enable establishment of a call session on behalf of a terminal in the multimedia network, and the control node further includes a security element to perform a security task with respect to messaging communicated for enabling establishment of the call session.

In general, according to another embodiment, a security gateway includes at least a first security module connected to a first network and a second security module connected to a second network, where a firewall is provided between the first and second security modules.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

Figure 1:
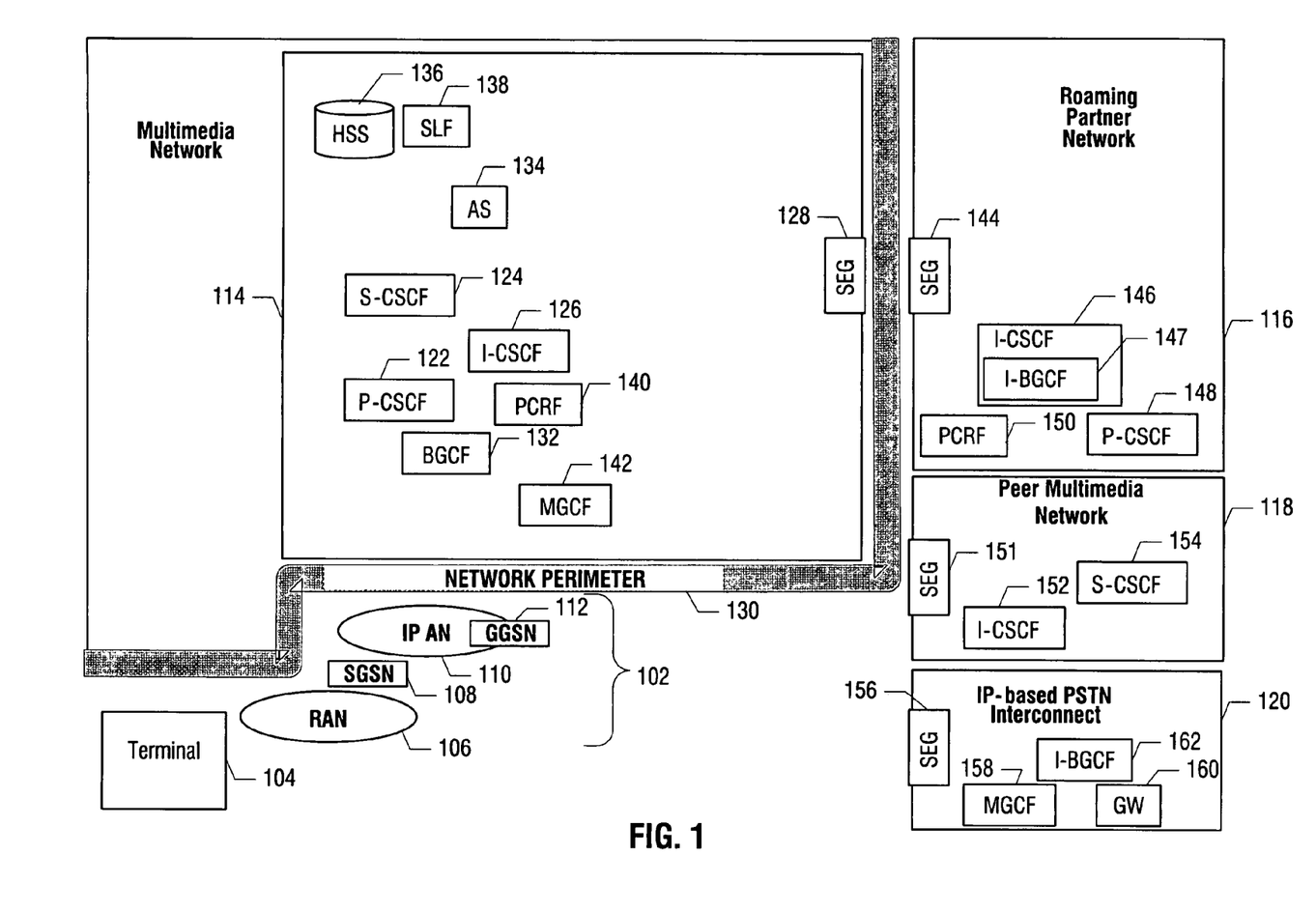
FIG. 1 is a block diagram of a communications network having control nodes containing security elements, in accordance with some embodiments.

FIG. 1 illustrates an example communications network that includes a wireless core network 102 to provide a terminal 104 wireless access for performing communications. The terminal 104 communicates wirelessly with a radio access network (RAN) 106, which in turn is coupled through a serving GPRS (General Packet Radio Services) support node (SGSN) to an Internet Protocol (IP) access network 110. The IP access network 110 has a gateway GPRS support node (GGSN). The SGSN 108 and GGSN 112 are part of a GSM (Global System for Mobile) or UMTS (Universal Mobile Telecommunications System) wireless network, as defined by the Third Generation Partnership Project (3GPP). Alternatively, the SGSN 108 and GGSN 112 can be replaced with a packet data serving node (PDSN) as used in a CDMA 2000 wireless network, as defined by 3GPP2.

For call signaling purposes, the terminal 104 is able to communicate through the wireless core network 102 to a multimedia network 114. In one example, the multimedia network is an IP multimedia subsystem (IMS) (as defined by 3GPP) that includes various control functions for providing multimedia services, including audio, video, text, chat, e-mail, web browsing, and so forth, or any combination of the above. Equivalents of the IP multimedia subsystem have been defined by other standards, such as a multimedia domain (MMD) network defined by 3GPP2 or a Next Generation Networks (NGN) for wireline networks defined by the Telecoms & Internet Converged Services & Protocols for Advanced Networks (TISPAN) committee of ETSI (European Telecommunications Standards Institute).

As used herein, reference to "IP multimedia network" or more simply "multimedia network" refers to any of the above networks or to any other network having control functions to provide multimedia services. The control functions in one or more multimedia networks are able to exchange messaging (call control messaging) for enabling the establishment of a multimedia call session (in which any of various multimedia services can be provided). A "multimedia call session" or "call session" refers to any session for communicating of any one or more of voice, other audio, video, text, chat, and others. A "control function" refers to hardware and/or software for performing call control tasks to enable establishment of multimedia call sessions. A call control task that enables establishment of a call session includes any one or more of a task to establish a call session, a registration task, a task to change a state of a call session, and other tasks. The various control functions depicted in FIG. 1 can be provided on separate physical control nodes, or at least some of the control functions can be grouped in a single physical control node.

Although FIG. 1 depicts terminal 104 as being a wireless mobile station, it is noted that the multimedia network 114 can also be coupled to wireline terminals (not shown), such that the control functions in the multimedia network 114 are able to also provide multimedia services on behalf of such wireline terminals.

In the example depicted in FIG. 1, the multimedia network 114 includes several call session control functions (CSCFs), including a proxy CSCF (P-CSCF) 122, a serving CSCF (S-CSCF) 124, and an interrogating CSCF (I-CSCF) 126. The P-CSCF 122 is the first call control contact point for a terminal (such as the terminal 104) in the multimedia network 114. Note that the P-CSCF can be the first point of contact for either a terminal whose home is the multimedia network 114 or for a terminal that is roaming in the multimedia network 114.

Among the tasks performed by the P-CSCF 122 is forwarding of call control messages (including Session Initiation Protocol (SIP) messages) to other control functions, call control message compression and decompression, and determination of which network a particular call control message should be routed to.

The I-CSCF 126 is the contact point within a service operator's network for connections destined to users in the service operator's network, or the contact point for a roaming user currently located within the network operator's service area. Example tasks performed by the I-CSCF 126 include handling initial registration (such as assigning a default S-CSCF to a terminal when performing SIP registration) via interrogating a home subscriber server (HSS) 136, routing of a call control message received from another network towards the S-CSCF, and other tasks.

The S-CSCF 124 handles session control within the multimedia network 114 on behalf of terminals. As discussed in further detail below, security elements are provided in each of the P-CSCF 122, I-CSCF 126, and S-CSCF 124, in accordance with some embodiments. These security elements as deployed in the P-CSCF, I-CSCF, and S-CSCF enhance security for communications within the multimedia network 114 and for communications between the multimedia network 114 and another network.

In accordance with some embodiments, a firewall is also provided in a security gateway 128 (also part of the multimedia network 114) to enhance the security tasks performed by the security gateway 128. A security gateway is an entity that is provided on the border of an IP security domain. In the example of FIG. 1, the IP security domain for the multimedia network 114 is located behind a network perimeter 130. The network perimeter is an abstract concept used to represent what is considered to be the border of the network or security domain.

FIG. 1 depicts several other IP security domains, including the security domains associated with a roaming partner network 116 (which is a network associated with another service operator that is different from the service operator associated with the multimedia network 114), a peer multimedia network 118, and an IP-based PSTN (public switched telephone network) interconnect network 120. IP traffic (including call control messages such as SIP messages) that travel across different IP security domains pass through corresponding security gateways; in other words, any IP traffic entering or leaving a security domain has to pass through a security gateway. The security gateway 128 is able to communicate with any of security gateways 144 (in the roaming partner network 116), security gateway 151 (in the peer multimedia network 118), and security gateway 156 (in the IP-based PSTN interconnect network 120).

In the above discussion, reference has been made to the Internet Protocol (IP) and Session Initiation Protocol (SIP). Versions of IP are described in Internet Engineering Task Force (IETF) Request for Comments (RFC) 791, entitled "Internet Protocol," dated September 1981 (IPv4); and RFC 2460, entitled "Internet Protocol, Version 6, IPv6 Specification," dated December 1998. A version of SIP is defined in RFC 3261, entitled "SIP: Session Initiation Protocol," dated June 2002.

SIP is an application-layer control (signaling) protocol for creating, modifying, and terminating multimedia sessions (any one or more of a voice session, other audio session, video session, text session, chat session, or any combination of the foregoing). As noted above, in accordance with some embodiments, SIP is used as the call control signaling protocol by the control functions of the multimedia network 114 (and other multimedia networks).

Other network elements of the multimedia network 114 are depicted in FIG. 1. Note that such other network elements are depicted for purposes of example, as different implementations of the multimedia network 114 can omit the depicted network elements or substitute the depicted network elements with other types of network elements. As shown in FIG. 1, the multimedia network 114 includes a breakout gateway control function (BGCF) 132, which is a SIP server used in a call session with a terminal in a circuit-switched network, such as the PSTN.

Another network element of the multimedia network 114 is an application server 134, such as a SIP application server to offer value-added multimedia services that are not provided by the S-CSCF 124. The application server 134 interfaces with the S-CSCF 124. Examples of services that can be provided by the application server 134 include caller ID-related services, call waiting, call holding, push-to-talk, call forwarding, call transfer, lawful interception, voicemail, conference call services, location-based services, and so forth.

Another network element in the multimedia network 114 is the home subscriber server (HSS) 136, which contains subscription-related information (such as user profiles) to perform authentication and authorization of users. The HSS 136 can also be used to provide information about the physical location of a terminal. If multiple home subscriber servers 136 are present, a subscriber location function (SLF) 138 is also provided.

Another network element in the multimedia network 114 is the policy control and charging rules function (PCRF) 140, which provides policy control and charging rules. Also, the multimedia network 114 includes a media gateway controller function (MGCF) 142, which performs call control protocol conversion between SIP and a circuit-switched call messaging protocol.

The roaming partner network 116 and the peer multimedia network 118 include many of the same elements as the multimedia network 114. FIG. 1 depicts a security gateway 144, an I-CSCF 146, an I-BGCF 147 in the I-CSCF 146 (the I-BGCF or interconnecting border gateway control function is discussed further below), a P-CSCF 148, and a PCRF 150 in the roaming partner network 116. FIG. 1 also depicts a security gateway 151, an I-CSCF 152, and an S-CSCF 154 in the peer multimedia network 118.

The IP-based PSTN interconnect network 120, which is used to allow terminals coupled to a multimedia network to communicate with a PSTN (or other form of circuit-switched network), includes a security gateway 156, an MGCF 158, and a media gateway 160 (which translates bearer traffic in the IP format into bearer traffic in circuit-switched format). The IP-based PSTN interconnect network 120 also includes an I-BGCF 162.

Additional details regarding the above control functions are provided in the following specifications: 3GPP TS 23.002, 3GPP TS 23.228, and 3GPP TS 33.210.

The following discussion focuses on various block diagrams that illustrate example paths for messaging among various control functions for establishment of multimedia call sessions. Note, however, that there are many other possible flow paths in other implementations.

Figure 2:
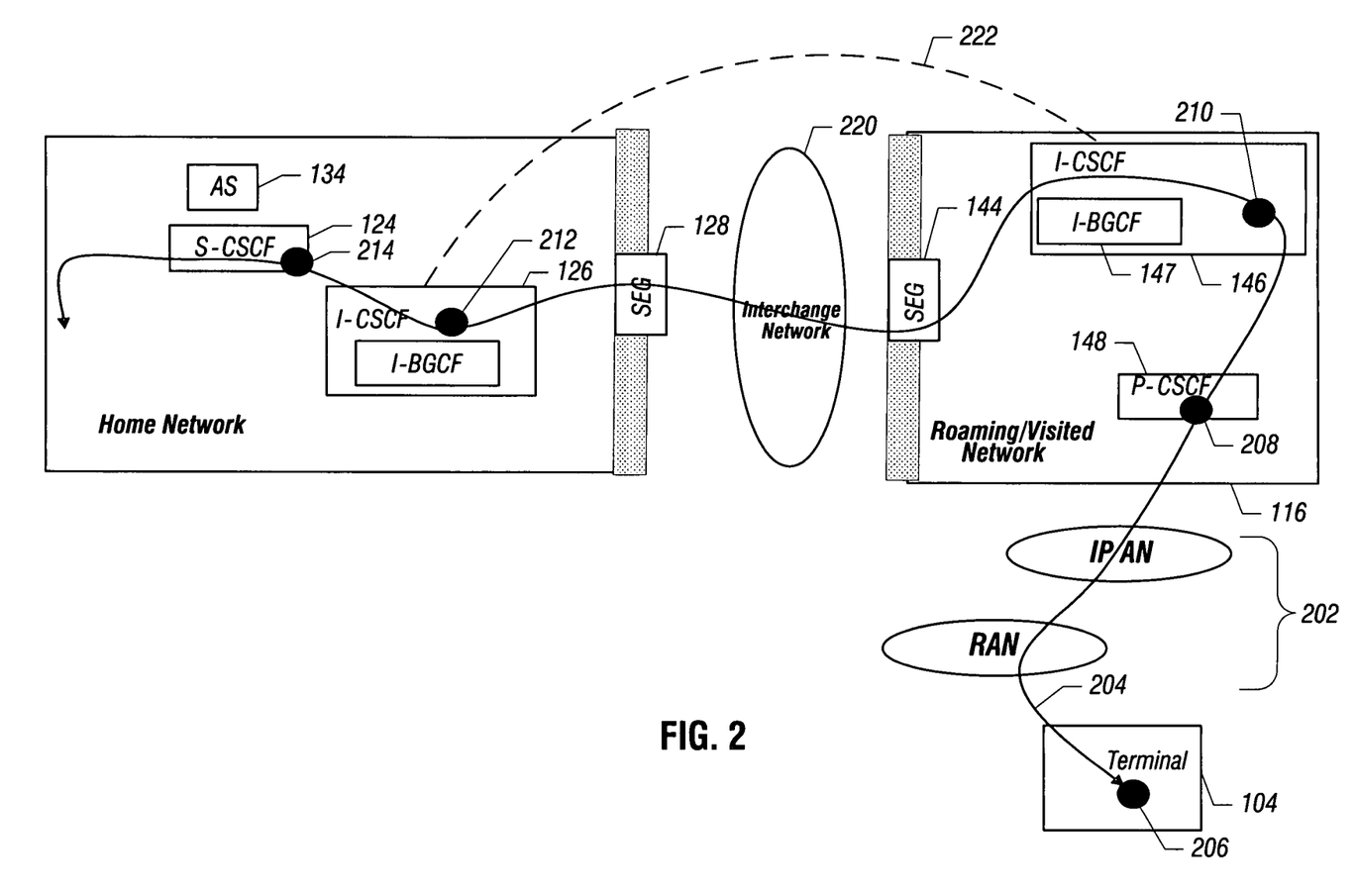
FIGS. 2, 4, and 6 are block diagrams to illustrate messaging paths among control nodes in multiple networks, in accordance with some embodiments.

The example of FIG. 2 shows the terminal 104 roaming in a roaming (or visited) network 116. In this arrangement, the terminal 104 interacts with a core network 202 of the visited network 116. As illustrated, a messaging path is represented generally as 204, which messaging path 204 extends from the terminal 104 through the core network 202, the visited network 116, an interchange network (optional) 220, and the home multimedia network 114. Dots 206, 208, 210, 212, and 214 are depicted in various control functions to depict that SIP processing is being performed at the corresponding control functions. The messaging path 204 depicted in FIG. 2 thus indicates the path for SIP messaging.

As depicted in FIG. 2, the first SIP call control point of contact for the roaming terminal 104 is a P-CSCF 216 in the visited multimedia network 116. The messaging path 204 continues through the I-CSCF 146 in the visited multimedia network, which messaging path continues through security gateways 144 and 128 (in respective visited multimedia network 116 and home multimedia network 114). The messaging path continues through the I-CSCF 126 of the home multimedia network 114 to the S-CSCF 124 in the home multimedia network 114, which S-CSCF 124 provides the call control services on behalf of the roaming terminal in the visited multimedia network 116.

Figure 3:
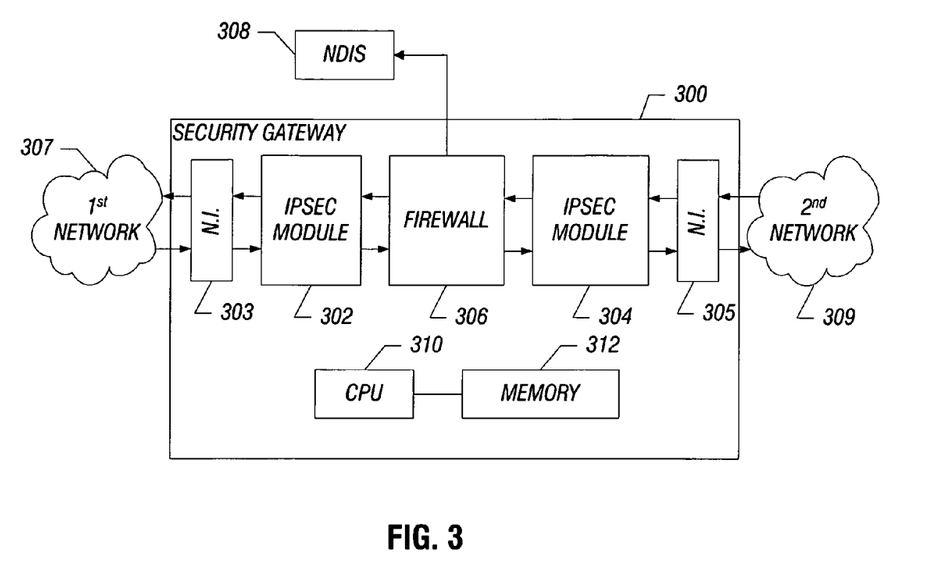
FIG. 3 is a block diagram of a security gateway in the communications network of FIG. 1, in accordance with an embodiment.

As depicted in FIG. 2, the messaging path 204 extending between the home multimedia network 114 and the visited multimedia network 116 passes through corresponding security gateways 128 and 144. FIG. 3 shows some components of a security gateway (labeled 300). The security gateway 300 of FIG. 3 can be either security gateway 128 or 144, or any of the other security gateways 151 and 156 depicted in FIG. 1.

In accordance with some embodiments, the security gateway 300 includes a first security module 302 and a second security module 304, where the first security module 302 is coupled to a first network 307 through a first network interface 303. The first network 307 of FIG. 3 can correspond to the home multimedia network 114 of FIG. 2. The second security module 304 is coupled to a second network 309 through a second network interface 305. The second network 309 of FIG. 3 can correspond to the visited multimedia network 116 of FIG. 2.

In some implementations, the security modules 302, 304 are IP Security (IPsec) modules. The IPsec protocol is described in part by RFC 4301, entitled "Security Architecture for the Internet Protocol," dated December 2005. Each of the IPsec modules 302, 304 allows the security gateway 300 to establish a secure session with another node in the corresponding network. Thus, the first IPsec module 302 is able to establish a secure session with a node in the first network 307, whereas the IPsec module 304 is able to establish a secure session with a node in the second network 309.

Under IPsec, an Internet Security Association and Key Management Protocol (ISAKMP) defines procedures and packet formats to establish, negotiate, and provide security services between network elements. Once the desired security services (as defined by a security association) have been negotiated between two entities, traffic is carried in IP Encapsulating Security Payload (ESP) packets or Authentication Header (AH) packets. ISAKMP is described in RFC 4306, entitled "Internet Security Association and Key Management Protocol (ISAKMP), dated December 2005; ESP is described in RFC 4303, entitled "IP Encapsulating Security Payload (ESP)," dated December 2005; and AH is described in RFC 4302, entitled "IP Authentication Header," dated December 2005.

In the FIG. 3 arrangement, the IPsec module 302 can establish a security association between the security gateway 300 and another node in the first network 307, and the IPsec module 304 can establish a different security association between the security gateway 300 and another node in the network 309. A security association indicates the types of security services that are associated with IP packets communicated between the security gateway 300 and the corresponding other node.

In accordance with some embodiments, a firewall 306 is provided between the two security modules 302 and 304. The firewall 306 performs various security tasks with respect to messaging passed through the security modules (in either direction). Generally, for messages received by the security gateway 300 from the second network 309, the messages are first decrypted by the security module 304, with the firewall 306 applies security tasks with respect to the decrypted messages received from the second network 309. If the firewall 306 accepts the messages received from the second network 309, the firewall 306 forwards the accepted messages to the security module 302 on the first network side, with the security module 302 applying encryption on the messages to forward to the first network 307.

A similar process is followed in the reverse direction, for messages received from the first network 307 and directed towards the second network 309.

The tasks performed by the firewall 306 include one or more of the following: determining if a message is properly formed; detecting if bad parameters are contained within the message; detecting if a message has the correct length; using access control lists in both the directions to determine whether ports that messages are coming from and/or ports that messages are being directed to are correct; and other firewall tasks. The security gateway 300 is also able to provide layer 3 and layer 4 denial-of-service (DoS) attack detection and prevention. Generally, DoS attacks are designed to cause a node or network to be flooded with traffic or to take an action that results in loss of service. Examples of a layer 3 DoS attacks (e.g., at the IP level) include sending excessive echo (ping) requests, such as ICMP (Internet Control Message Protocol) echo requests; spoofed or invalid IP addresses; sending IP traffic management messages to cause an improper route update; and sending improperly formatted IP fragments. Examples of layer 4 DoS attacks (at the transport layer, such as at the TCP or UDP layer) include SYN flooding by sending an excessive number of TCP SYN packets; UDP flooding by sending an excessive number of UDP packets; sending improperly fragmented TCP or UDP packets; spoofing TCP or UDP ports; sending UDP packets with bad checksums, and sending TCP or UDP packets with invalid lengths.

The arrangement of the security gateway 300 as depicted in FIG. 3 provides for a bi-directional firewall 306, which firewall 306 protects communications going in both the egress and ingress directions. If the second network 309 is assumed to be the external network and the first network 307 is assumed to be the internal network, then the ingress direction is from the second network 309 to the first network 307 through the security gateway 300, and the egress direction is from the first network 307 to the second network 309 through the security gateway 300. Unlike conventional security gateways that face in just one direction (usually the outside direction to protect against attacks from the outside), the security gateway 300 according to some embodiments faces in both directions, with the firewall 306 performing bi-directional protection to prevent a security compromise in one network from propagating to another network.

In one embodiment, if the security gateway 300 is the security gateway 128 of the home multimedia network 114, then the interface from the IPsec module 302 to the first network is a Zb interface (which is an interface between a security gateway and a non-security gateway network element), while the interface from the IPsec module 304 to the second network is a Za interface (which is an interface between security gateways belonging to different networks or security domains). On the other hand, if the security gateway 300 is the security gateway 144 of the visited multimedia network 116, then the interface from the IPsec module 302 to the first network is a Za interface, while the interface from the IPsec module 304 to the second network is a Zb interface.

If some type of security violation is detected (such as intrusion by some network device) by the firewall 306, the firewall 306 according to some embodiments can provide copies of the messages involved in such intrusion to a network intrusion detection system (NIDS) 308.

The above discussion refers to security domains corresponding to different networks associated with different service operators. In another arrangement, within a single multimedia network associated with a single service operator, multiple security domains can be defined for different partitions of the same network (such as for different geographic regions of the network, for different clusters of functions, etc.). Security gateways in accordance with some embodiments can also be provided in the different partitions of the same network, where messaging across multiple partitions is passed through the security gateways of respective partitions.

Although the security gateways that include firewalls according to some embodiments provide an enhanced level of protection for messages communicated across security domains, it is noted that the security gateways by themselves may not offer comprehensive protection. In accordance with some embodiments, security elements are also provided in various other network elements, including control functions such as the P-CSCF, I-CSCF, and S-CSCF.

As noted above, the P-CSCF is the first SIP point of contact for the terminal in the respective multimedia network. The P-CSCF provides an IPsec termination point to allow the establishment of a security association between the terminal and the P-CSCF. This allows the P-CSCF to authenticate messaging from the terminal and to perform basic identity checks (by performing identity authentication according to IPsec, for example). In accordance with some embodiments, the security element is provided to allow the P-CSCF to perform protocol correctness checks, including determining whether required SIP headers are present in a message, whether the message has the correct length, to strip forbidden items from the message, and to check against known attack signatures.

Another task performed by the security element of the P-CSCF is to verify access network information. In SIP messaging sent by the terminal, access network information, including the cell identifier (which identifies the cell the terminal is located in) and the cell name (name of the cell the terminal is located in) can be inserted into the SIP messaging. Since the P-CSCF generally is aware of (or is capable of interacting with other nodes to determine) where the terminal is located, the P-CSCF can verify that the cell identifier and the cell name included in the SIP messaging actually corresponds to the location of the terminal. This type of verification enables the P-CSCF to determine when a terminal has inserted false access network information into SIP messaging. Examples of uses for access network information include billing, routing, lawful intercept, emergency services, and other tasks. False access network information may cause incorrect actions to be taken, such as improper billing when location information is a billing attribute, incorrectly locating the terminal, selecting the wrong nodes to process a call, and so forth. The access network information is generally inserted as a header into an SIP message, where the header has parameters containing the various access network information.

Optionally, the security element of the P-CSCF is also able to interact with the PCRF (which is generally used for authorizing QoS and to apply service policy). In accordance with some embodiments, the P-CSCF is able to interface with the PCRF to validate media addresses as belonging to the terminal. Certain SIP messages, such as the SIP Invite message (sent by an originator to establish a SIP call session) contains media IP addresses specifying where the media (associated with the call session) is to be communicated. The media includes voice, other audio, video, text, and/or chat media. This media address is also referred to as an SDP (Session Description Protocol) address, where SDP is a format for describing multimedia sessions. SDP is described in RFC 4566, entitled "SDP: Session Description Protocol," dated July 2006.

Spoofing of the media address by a terminal (where the terminal inserts a false media address) can cause a destination device (which is the target that is being called) to send the media to an incorrect endpoint. This can be used to perform an attack of such an endpoint by causing media to be sent to the incorrect endpoint for the purpose of overwhelming or otherwise confusing the endpoint subject to the attack. The security element of the P-CSCF according to some embodiments is able to validate the media addresses contained in SIP messages as actually belonging to the terminal that sent the SIP messages, such that spoofed (incorrect) media addresses would fail the authorization. Any SIP messages for which media addresses cannot be authorized are not forwarded to their intended targets.

In some cases, the P-CSCF may not know the IP address of the terminal or the access network serving the terminal. In this situation, the security element of the P-CSCF can access the PCRF for the purpose of verifying the media address contained in SIP messages as well as in verifying the access network information passed by the terminal as described above. The validation can be delegated to the PCRF, or alternatively, the security element of the P-CSCF can request information from the PCRF to perform the validation at the P-CSCF.

Another security task that can be performed by the security element in the P-CSCF according to some embodiments is performing user protocol DoS attack prevention. For example, a terminal may attempt to send a large number of SIP registration messages (a registration message is sent to register a terminal in a network) to a network in an attempt to overwhelm the network. The P-CSCF, as the first contact point in the network, is able to detect such a large number of SIP registration messages, as the detection can be based, for example, on a rate or some other volume indication regarding SIP registration messages (or other forms of SIP messages). If a DoS attack is detected, the P-CSCF can refuse to accept further messages from the offending terminal.

Another security task that can be performed by the security element of the P-CSCF is protocol normalization. The P-CSCF translates the format of messages (such as the headers in SIP messages) to a different format that can be used by the network. Alternatively, the P-CSCF can also insert additional headers into SIP messages, such as proprietary headers of the particular service operator. The headers of an SIP message typically include the From/To header, the Via header, access network information header, authentication header, SDP header, type of message header, and so forth.

As depicted in FIG. 2, the P-CSCF 148 can provide any of the security tasks discussed above with respect to the terminal 104 that is roaming in the visited network 116.

Figure 4:
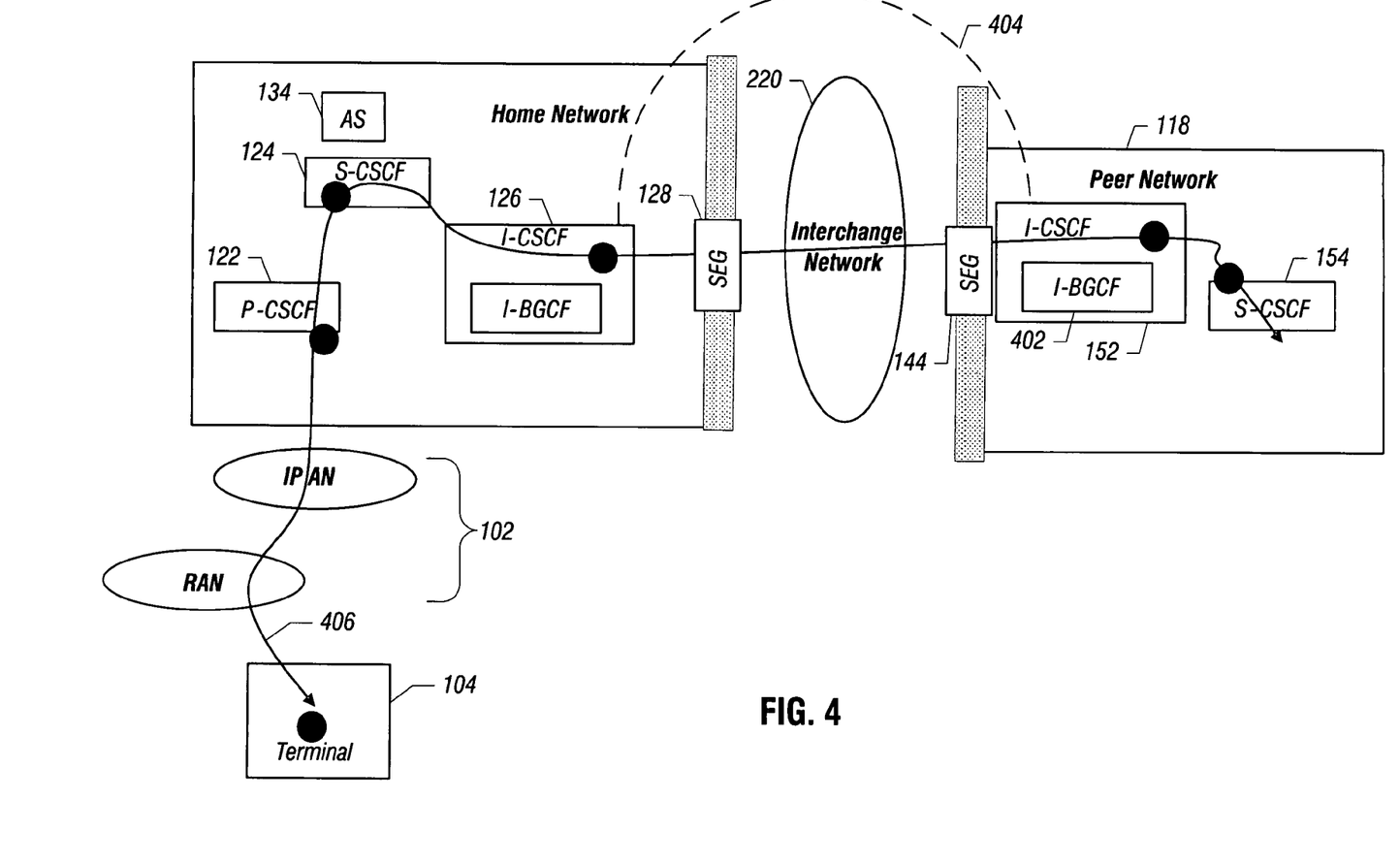

Similar security tasks can be performed with respect to the terminal 104 when the terminal 104 is in its home multimedia network 114. As depicted in FIG. 4, the P-CSCF 122 is the first SIP point of contact for the terminal 104 in the home multimedia network 114. In the example depicted in FIG. 4, SIP messaging is exchanged between the terminal and another endpoint (not shown) through a message path 406 that extends through the core network 102, P-CSCF 122, S-CSCF 124, I-CSCF 126, security gateway 128, interchange network 220, security gateway 144, I-CSCF 152 in the peer multimedia network 118, and the S-CSCF 154 in the peer multimedia network 118. In the arrangement of FIG. 4, the P-CSCF 122 performs security tasks discussed above with respect to the terminal 104.

In addition to the security tasks performed by the P-CSCF (122 in FIG. 4 or 148 in FIG. 2), security tasks can also be performed by a security element in the I-CSCF (such as any of I-CSCF 126, 152 in FIG. 4, and I-CSCF 146 in FIG. 2). Security tasks performed by the security element of the I-CSCF include topology hiding, where the topology hiding is performed by stripping or encrypting headers in SIP messages such that the internal network infrastructure of a particular network is hidden from outside entities to prevent propagation of internal network infrastructure information (which can be used by hackers to perform unauthorized access). Topology hiding is one example of protecting multimedia networks from each other (in the context of FIG. 2, the home and visited multimedia networks 114 and 116 are protected against each other; and in the context of FIG. 4, the home multimedia network 114 and the peer multimedia network 118 are protected against each other).

For further protection between networks, messages are also routed through the security element of the I-CSCF for communications between networks. For example, as depicted in FIG. 2, the roaming terminal 104 communicates SIP messaging through the P-CSCF 148 and I-CSCF 218 in the visited multimedia network 116 to the I-CSCF 126 in the home multimedia network 114. Note that even though the terminal 104 is roaming in the visited multimedia network, services are still provided by the S-CSCF 124 in the home multimedia network 114.

If SIP messaging were not passed through the I-CSCF 146 in the visited multimedia network 146 of FIG. 2 prior to communication to the home multimedia network 114, then adequate security (against unauthorized access by the roaming terminal 104) may not be provided in the visited multimedia network 116. Thus, in accordance with some embodiments, both the security element in the I-CSCF 146 provides security tasks with respect to SIP messaging communicated with the roaming terminal 104 (in addition to any security tasks performed by the P-CSCF 148) in the visited network 116. The I-CSCFs in other networks (such as I-CSCFs 126 and 152 in the multimedia network 114 and peer multimedia network 118 in FIG. 1) can perform similar security tasks.

The security element in the I-CSCF performs protocol screening and basic authorization to ensure that SIP options in SIP messages are correct according to a network-wide agreement between service operators (e.g., the terminal is not requesting video options when video is not authorized by agreement). Also, the security element in the I-CSCF performs protocol normalization (such as translating formats of SIP message headers or adding SIP message headers).

The security element of the I-CSCF also performs identity checks to ensure that identity assertions in a SIP message (received from a peer service operator) correspond to an authenticated identity. The identity checks ensure that service operators cannot spoof other service operators. For example, if there are three service operators associated with three networks (e.g., operator A, operator B, and operator C), then a network element in the operator C network may falsely assert an identity of a network element in the operator B network, in messages communicated to operator A network. The security element in the I-CSCF provides the identity check to ensure that such spoofing of identities is prevented.

A network element can make assertions with respect to its identity in many different ways. For example, identities can be asserted in a To: field of an SIP Register message, a From: field of an SIP Invite or Register message, a P-Associated-URI field of an IMS SIP message, or the P-Preferred-Identity field of an IMS SIP message.

The asserted identity is compared with an authenticated identity by the security element in the I-CSCF. Effectively, the security element in the I-CSCF performs two levels of authentication. The lower-level identity check is performed during registration. This authenticated identity when compared to the asserted identity during operation is a second level identity check.

Another security task performed by the security element in the I-CSCF is the establishment of a security association between I-CSCFs (belonging to different multimedia networks) on top of other lower-level security associations established between network elements on a hop-by-hop basis. For example, in FIG. 2, in the visited multimedia network 116, a security association is established between the I-CSCF 146 and the security gateway 144, where the interface between the I-CSCF 146 and the security gateway 144 is a Zb interface. Similarly, another security association is established over a Zb interface between the I-CSCF 126 and the security gateway 128 in the home multimedia network 114. Yet another security association is established between the security gateways 128, 144 over a Za interface between the security gateways in the two different networks 114, 116. Thus, three hop-by-hop security associations are established among the nodes connecting the I-CSCFs 126 and 146.

In accordance with some embodiments, the security element of each of I-CSCFs 126 and 146 includes IPsec functionality (or TLS—transport layer security—or any other security layer) to establish a higher-level security association 222 (referred to as a logical security association or application-level security association) between the I-CSCFs 126 and 146. FIG. 4 shows a similar establishment of an application-level security association 404 between I-CSCFs 126 and 152 in the home multimedia network 114 and peer multimedia network 118, respectively.

As further depicted in FIG. 2, I-BGCFs 224 and 147 are provided in respective I-CSCFs 126 and 146. As noted above, the I-BGCF (interconnecting border gateway control function), or alternatively interconnecting border control function (IBCF), performs several tasks. The I-BGCF issues policy instructions regarding the media plane (the plane associated with communication of media traffic), where such policy instructions are used to open or close "pinholes" to media traffic. Media pinholes refer to media paths opened through the multimedia network to allow the flow of media traffic. Note that the media path typically follows a different path than the signaling path. As one example, the policy instructions issued by the I-BGCF can indicate when the media path is to be opened (such as an instruction to open the media path when an answer is received from the destination terminal).

The policy instructions can be communicated to a PCRF (such as PCRF 140, 150 in FIG. 1) to enforce (apply) the policy instructions. Alternatively, the PCRF (or the I-BGCF) can issue the policy instructions to a policy enforcement point (not shown) of the multimedia network that enforces (applies) the policies indicated in the policy instructions.

The policy instructions from the I-BGCF can also specify media characteristics (e.g., bandwidth, media type, etc.) that can be expected for any particular media session. The policy instructions can specify that the media session is to be terminated if the media has different characteristics (data rate exceeds the expected bandwidth, the media type is different from the expected media type, etc.) from the characteristics expected.

The I-BGCF can also issue policy instructions to authorize QoS. Based on the media characteristics, the policy instructions can be used to specify the expected QoS.

The PCRF (or the policy enforcement point) checks that QoS requests, which can be in the form of differentiated services code points (DSCPs) in IP packets, are consistent with the expected QoS.

Although depicted as being part of I-CSCFs, it is noted that the I-BGCFs can also be stand-alone functions separate from the I-CSCFs.

I-BGCFs can also be used in call sessions between a multimedia network and a circuit-switched network such as a PSTN. For example, in FIG. 6, a call session can be established between the terminal 104 in the home multimedia network 114 and an IP-based PSTN interconnect network 120. In a signaling flow (SIP signaling flow) to the IP-based PSTN interconnect network 120, the messaging path 654 extends from the terminal 104 through the core network 102, P-CSCF 122, S-CSCF 124, BGCF 132, MGCF 142, security gateways 128 (in the home multimedia network 114), and security gateway 156, I-BGCF 162, and MGCF 158 (in the IP-based PSTN interconnect network 120). In a signaling flow from the IP-based PSTN interconnect network 120, the messaging path 654 is the same except it passes through the I-CSCF 126 in the home multimedia network 114 rather than the BGCF 132.

Figure 6:
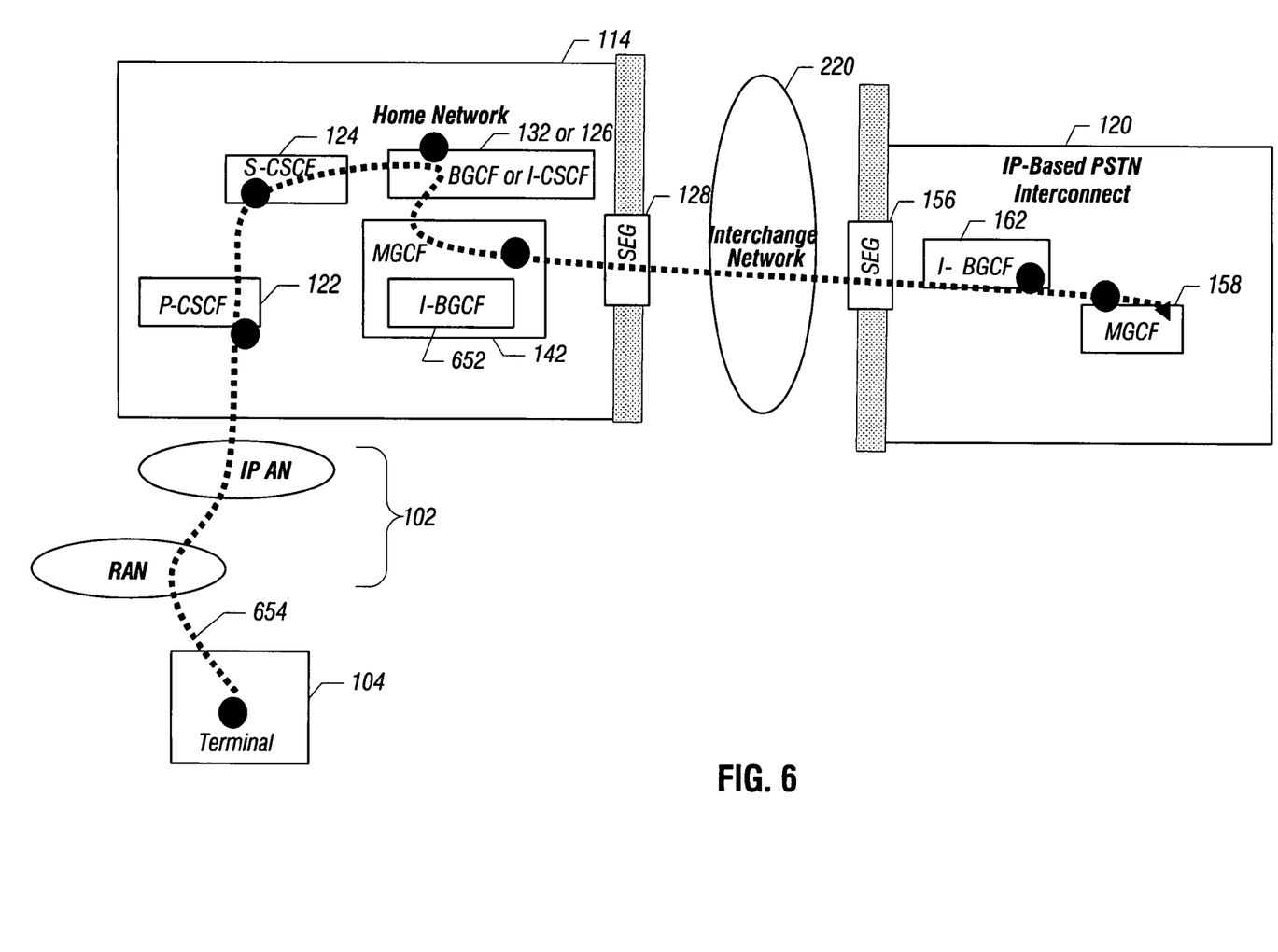

In the example of FIG. 6, an I-BGCF 652 (which performs similar tasks as the I-BGCF discussed above) is implemented as part of the MGCF 142 in the home multimedia network 114. In the IP-based PSTN interconnect network, the I-BGCF 162 is a stand-alone function.

S-CSCFs can also include security elements to perform security tasks. As examples, the security tasks of S-CSCFs include limiting the rate of session attempts. A terminal may be attempting to establish too many sessions in some given time period. For example, the terminal may send a large number of simultaneous requests for sessions, or alternatively, the terminal may send a series of requests one after another for establishing sessions.

If the S-CSCF detects an excessive number of session attempts, then the S-CSCF may deny any further requests from the terminal (or other network element). Another security task that can be performed by the S-CSCF is fraud detection. For example, a transaction originates from a visited network domain where the terminal is not registered may be considered fraudulent. When a terminal roams into a visited network, the terminal normally performs a registration procedure in the visited network. If the S-CSCF detects that a transaction originated from a visited network where the terminal was not registered, then that indicates that the terminal may be attempting to perform some fraudulent action.

The S-CSCF can also perform fraud detection in the context of instant messaging sessions (chat sessions) or Internet telephony (voice-over-IP) sessions. For example, if a particular terminal attempts too many session attempts, then that is an indication that the terminal may be spamming (sending excessive messages which are annoying, unwanted, or offensive to other users typically associated with solicitations), whether such spam is an instant message (in industry parlance SPIM—spam instant messaging) or unwanted call sessions (in industry parlance SPIT—spam internet telephony).

The security element in the S-CSCF can also perform security tasks with respect to an application server (for sessions that involve the application server). For example, the security element can check whether a particular service provided by the application server is authorized.

Figure 5:
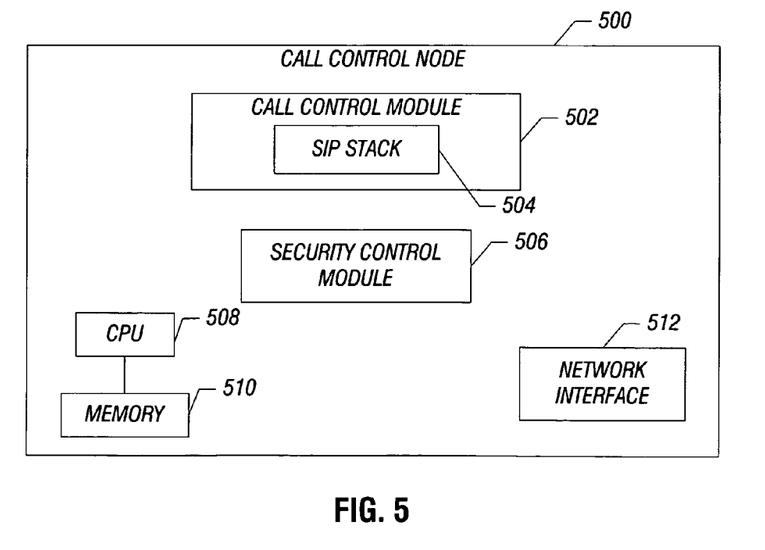
FIG. 5 is a block diagram of a control node that includes a call control module and a security element, according to an embodiment.

FIG. 5 shows a call control node 500, which can include any one or more of a P-CSCF, I-CSCF, or S-CSCF, as discussed above. The call control node 500 includes a call control module 502, which performs a call control task to enable establishment of a call session on behalf of a terminal in a multimedia network. Also, the call control module 502 cooperates with another control node to perform the call control task (e.g., P-CSCF cooperating with an I-CSCF or S-CSCF; I-CSCF cooperating with a P-CSCF, an S-CSCF, or another I-CSCF; and so forth).

As depicted in the embodiment of FIG. 5, the call control module 502 includes a SIP stack 504 for processing SIP messages. Additionally, in accordance with some embodiments, the call control node 500 includes a security control module 506 (which is the security element referred to above), which is capable of performing the various security tasks discussed above in connection with the P-CSCF, I-CSCF, and S-CSCF. Generally, the security control module 506 performs a security task with respect to messaging communicated for enabling establishment of a call session. Messaging communicated for enabling establishment of a call session refers to one or more of messaging to establish a call session, messaging to change a state of a call session, registration messaging, and other messaging related to call sessions. The call control module 502 and security control module 506, in some embodiments, are software modules executable on a CPU 508 in the call control node 500. The CPU 508 is connected to memory 510.

The call control node 500 also includes a network interface 512 to allow the call control node 500 to communicate with a network, which can be any of the networks depicted in FIGS. 1, 2, 4, and 6, as examples.

Figure 7:
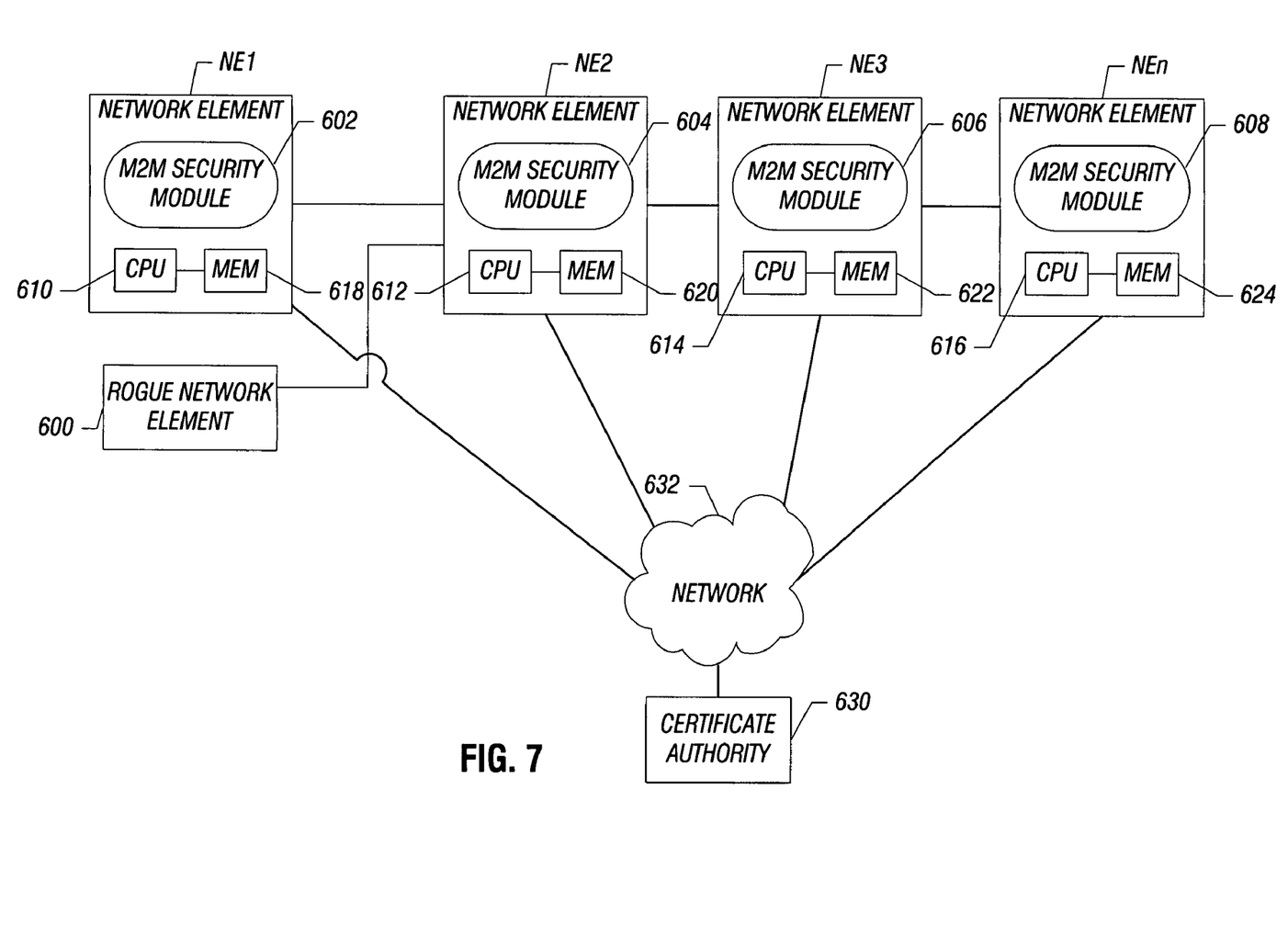
FIG. 7 is a block diagram of control nodes that contain middle-to-middle security modules, according to another embodiment.

Hop-by-hop security is provided between network elements using either IPsec or a transport layer security between any pair of network elements. However, an issue associated with hop-by-hop security between network elements is that a given network element has to trust that the immediately upstream network element has properly authenticated and authorized communications from network elements that are further upstream. Thus, for example, in the arrangement of FIG. 7, network element NE3 has to trust that an upstream network element that any two received messages from was properly authenticated and authorized. However, that may not be true, as shown in the example of FIG. 7. There may be a rogue network element 600 upstream that is communicating through network element NE2 to further downstream network elements, such as NE3 and NEn. Network element NE2 may have missed that the rogue network element 600 is not an authorized network element in the communications network. If this occurs, then the downstream network elements, such as NE3 and NEn, would not be able to detect that messaging received by any NE3 or NEn actually originated from the rogue network element 600.

In accordance with some embodiments, to address the issue of authenticating upstream network elements, a middle-to-middle (M2M) security mechanism is provided, in which any network element in a path can verify that the entire chain of network elements traversed is legitimate. As depicted in FIG. 7, each of the network elements in the network is provided with an M2M security module, including M2M security module 602, 604, 606, and 608 in network elements NE1, NE2, NE3, and NEn, respectively. Each of the M2M security modules 602, 604, 606, and 608 can be implemented with software that is executable on corresponding CPUs 610, 612, 614, and 616. The CPUs 610, 612, 614, 616 are connected to respective memories 618, 620, 622, 624. The lines drawn between network elements NE1, NE2, NE3, and NEn, represent networks.

In accordance with some embodiments, as a message (such as a SIP message) traverses through network elements in one or more networks, each M2M security module adds a certificate (in the form of a header) to the message (e.g., an SIP message). Alternatively, instead of adding the certificate as a header, the certificate may be added as an information element in an existing header, or alternatively, the certificate can be added to the payload of the message.

In one implementation, the certificate is referred to as P-proxy-cert, where P-proxy-cert has the following form: P-proxy-cert: <Identity>; <Cert-Format>; <Cert>. The <Identity> field provides an identity of the network element that added the certificate, and the <Cert-Format> field indicates the format of the <Cert> field. The <Cert> field is the digital signature that is based on the content of the message (which can be the entire message or some subset of the message to be protected). The digital signature in the <Cert> field is calculated as follows: the content of the message to be secured is provided to a hash function, which computes a hash on the content of the message. A transform function is then applied on the hash to produce an encrypted digital signature, which is inserted into the <Cert> field.

In one embodiment, the <Identity> field has identity information according to the format defined by RFC 1779, entitled "A String Representation of Distinguished Names," dated March 1995. Also, in one implementation, the certificate format is in the CMS (Cryptographic Message Syntax) SignedData format, as described in RFC 3852, entitled "Cryptographic Message Syntax (CMS)," dated July 2004. In other implementations, other formats can be used for the digital signature in the <Cert> field.

An example certificate is provided below:
P-proxy-cert: CN=RchsipProxy.nortel.com, OU=Nortel Networks Richardson, O=Nortel Networks, C=US; CMS; MIAGCSqGSIb3DQEHAqCAMIACAQExADCABgkqh kiG9w0BBwEAAKCAM IIBrTCCAUkCAg C2MA0GC SqGSIb3DQEBAgUAME0x CzAJBgNVBAYTAlVTMSA gYDVQQKExdSU0EgRGF0YSBTZWN1cml0eSwgSW5j LjEcMBoGA1UECxMTUGV 29uYSBDZXJ0aWZp Y2 F0ZTAe Fw05NDA0MDkwMDU wMzdaFw05 NDA4 MDIxOD TdaMGcxCzAJBgNVBAYTAlVTMSAwHgYD VQQKExd SU0EgRGF0YSBTZWN1cm SwgSW5jLjEc MBo GA1UECxMTUGVyc29uYSBDZXJ0aWZ0a WZpY2 F0ZTEYMBYGA1U xMPU2V0Z WMg QXN0 cm9ub 215MFwwDQYJKoZIhvc NAQEBBQADSwAwSAJBA cW7RMrB4sTdQ8Nmb2DFmJmkWn+el+NdeamIDElX/ qw9mIQu4xNj1FfepfJNx zPvA0OtMKhy6+bkrlyMEU8C AwEAATANBgkqhkiG9w0BAQIFAANPAA Yn7jDgi rhiIL 4wnP8nGzUisGSpsFsF4/7z2P2wqne6Qk8Cg/Dstu3 Rya N78 v AMGP8d8 2H5+Ndfhi2mRp4 YHiGHz0HlK6Vb PfnyvS2wdjCCAccwggFR AgUCQAAAFDANB gkqhki G9w0BA QIFADBfMQswCQYDVQQGEwJVUzEg MB4 GA1UEChMXUlNBIER hdTiq4Lnwg TdA8x QX4elJz9 QzQobkE3XVOjVAtCFcmiin 80RB8AAAMYAAAAA=

The <Identity> field in the example above has common name (CN) "RchsipProxy.nortel.com," organizational unit name (OU) "Nortel Networks Richardson," and organization name (O) "Nortel Networks," and country name "US." The format specified is CMS, and the digital signature follows "CMS;".

As a message passes through multiple network elements, additional certificates are added to the message. A receiving network element can verify any of the certificates in the message to authenticate any network element in the path of the message. However, in accordance with some embodiments, the network element does not remove the certificate. Removal of a certificate is considered a protocol violation that can be detected by using any one of various techniques. For example, the digital signature may be based on the content of the message that includes the inserted certificates, such that removal of any certificate would cause a check based on the signature to fail. Alternatively, the receiving network element has access to information regarding the topology of the network, such that the receiving network element can determine a path (including network elements) that any particular message should follow.

In this manner, the receiving element can determine that a certificate that should have been added by a particular network element is missing.

The last network element in the chain can remove all certificates prior to routing the message to the endpoint (such as terminal 104). An example network element that can perform removal of certificates is the P-CSCF, which is the last network element in the multimedia network prior to transmission of messaging to the terminal.

Verification is performed in both directions. Identity checks may be performed in real-time (as messages are received by each network element) or offline. The action taken can be applied to the message that is being processed, or the action can be taken on a subsequent message passing through the network element.

Figure 8:
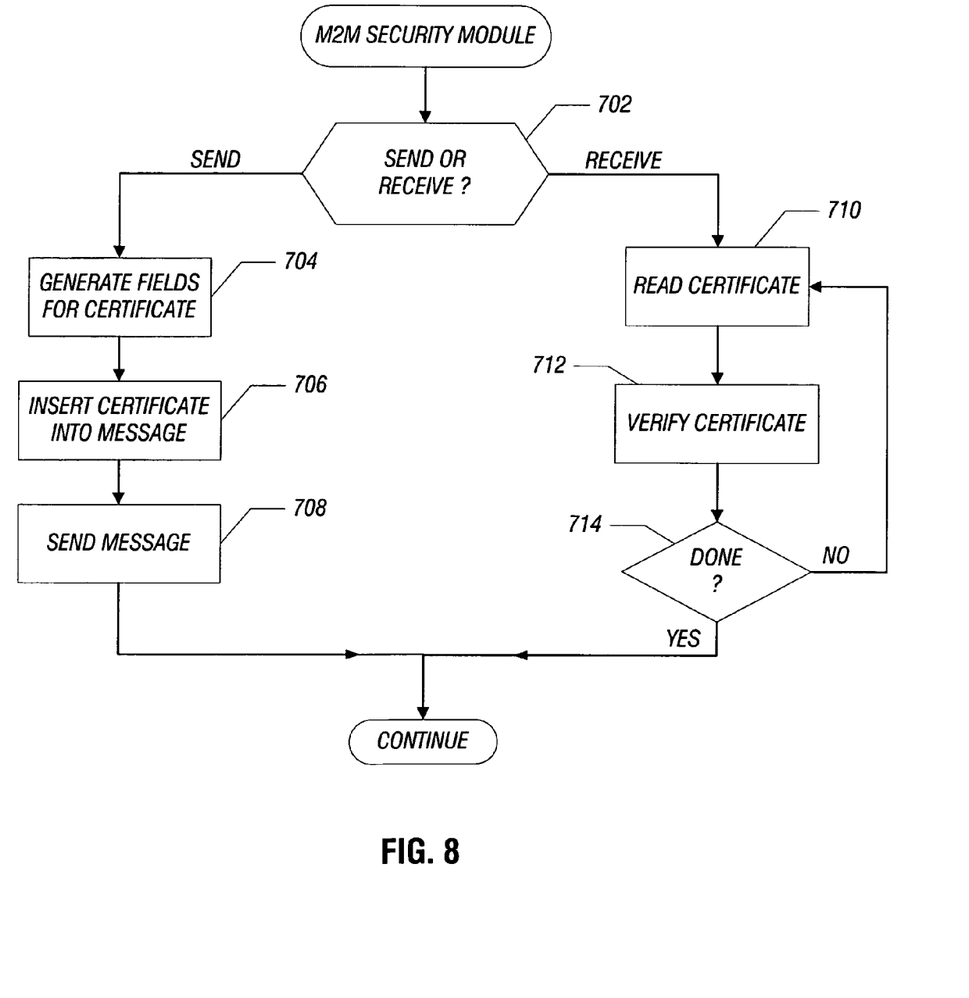
FIG. 8 is a flow diagram of a process of performing a middle-to-middle security procedure with the middle-to-middle security modules of FIG. 7.

FIG. 8 shows a flow diagram of a process performed by the M2M security module according to some embodiments. The M2M security module determines (at 702) whether the network element is sending or receiving a message. To send a message, the M2M security module generates (at 704) fields (<Identity>, <Cert-Format>, and <Cert> in the example above) for the certificate. The certificate is then inserted into the message (at 706), and the modified message with the inserted certificate is sent (at 708).

If the M2M security module detects (at 702) that it has received a message containing certificates, the M2M security module reads (at 710) a certificate from the message. The M2M security module then verifies (at 712) the certificate. Verification can be performed by sending a certificate (and more specifically the digital signature in the certificate) to a certificate authority 630 (FIG. 7) over a network 632. Based on the digital signature of the certificate, the certificate authority 630 is able to produce an identity of the network element associated with the digital signature. The identity derived by the certificate authority 630 is sent back to the requesting network element to allow a comparison of the identity derived by the certificate authority 630 with the identity contained in the <Identity> field of the certificate.

If the verification fails, then some action is taken. The M2M security module also checks (at 714) if all certificates have been verified. If not, the processes at 710 and 712 are repeated.

Instructions of the various software modules discussed herein (e.g., call control module 502, security control module 506, M2M security modules 602, 604, 606, and 608 in FIGS. 5, 7) are loaded for execution on corresponding processors (such as CPUs 508, 610, 612, 614, and 616 in FIGS. 5 and 7). Processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software are loaded or transported to each entity in one of many different ways. For example, code segments including instructions stored on floppy disks, CD or DVD media, a hard disk, or transported through a network interface card, modem, or other interface device are loaded into the entity and executed as corresponding software routines or modules. In the loading or transport process, data signals that are embodied in carrier waves (transmitted over telephone lines, network lines, wireless links, cables, and the like) communicate the code segments, including instructions, to the entity. Such carrier waves are in the form of electrical, optical, acoustical, electromagnetic, or other types of signals.

While some embodiments have been disclosed with respect to a limited number of embodiments, those skilled in the art will appreciate numerous modifications and variations there from. It is intended that the appended claims cover such modifications and variations as fall within the true spirit and scope of some embodiments.

What is claimed is:

1. A first control node for use in a multimedia network, comprising:
   a call control module configured to:
      perform a call control task to enable establishment of a call session in the multimedia network on behalf of a terminal, wherein the multimedia network has control functions to provide Internet Protocol multimedia services, and
      cooperate with a second control node to perform the call control task; and
   a security element configured to perform a security task with respect to messaging communicated for enabling establishment of the call session, wherein the security task includes checking a location of the terminal and determining whether an unauthorized action is being attempted based on checking the location of the terminal, wherein checking the location of the terminal includes at least one of:
      comparing a cell identifier provided by the terminal with a cell identifier provided by an entity other than the terminal; and
      comparing a cell name provided by the terminal with a cell name provided by an entity other than the terminal.

2. The first control node of claim 1, wherein the security element is configured to further perform plural other security task selected from among determining whether a required header is present in the messaging, determining whether the messaging has a correct length, removing a forbidden item in the messaging, checking for a known attack signature in the messaging, and detecting a denial-of-service attack.

3. The first control node of claim 1, wherein determining whether an unauthorized action is being attempted based on checking the location of the terminal comprises determining whether access network information contained in the messaging corresponds to an expected location of the terminal.

4. The first control node of claim 1, wherein the security element is configured to further perform verifying that a media address contained in the messaging belongs to the terminal, wherein the media address specifies where media associated with the call session is to be communicated.

5. The first control node of claim 1, further comprising a call session control function (CSCF) that includes the call control module and the security element, wherein the CSCF comprises one of a proxy CSCF (P-CSCF), an interrogating CSCF (I-CSCF), and a serving CSCF (S-CSCF).

6. The first control node of claim 1, wherein the security element is configured to further normalize protocol of the messaging, wherein normalizing the protocol of the messaging comprises at least one of translating a protocol header in the messaging and adding a header to the messaging.

7. The first control node of claim 1, wherein the security element is configured to further perform comprises one of stripping a header and encrypting a header to hide an internal multimedia network infrastructure from another network.

8. The first control node of claim 1, wherein the multimedia network is a first multimedia network, the first control node is part of the first multimedia network, the second control node is part of a second multimedia network, and the second control node comprises an interrogating call session control function (I-CSCF), and
   wherein the call control module of the first control node is configured to receive to receive call control messaging from the I-CSCF originated by a terminal in the second multimedia network.

9. The first control node of claim 1, wherein at least one additional node is provided between the first and second control nodes such that a first security association is defined between the first control node and the at least one additional node and a second security association is defined between the second control node and the at least one additional node, and wherein the security element is configured to establish a higher-level security association between the first control node and the second control node, the higher-level security association being above the first and second security associations.

10. The first control node of claim 1, wherein at least a first additional node and a second additional node are provided between the first and second control nodes such that a first security association is defined between the first control node and the first additional node and a second security association is defined between the second control node and the second additional node, and wherein the security element is configured to establish a higher-level security association between the first control node and the second control node, the higher-level security association being above the first and second security associations.

11. The first control node of claim 1, wherein the second control node is part of a second multimedia network, and wherein the security element of the first control node is configured to verify an identity assertion by the second control node.

12. The first control node of claim 1, wherein the security element is configured to further perform at least one of: checking that excessive session establishment is being attempted by the terminal; mitigating spam messaging; and checking whether a service performed by an application server is authorized.

13. The first control node of claim 1, further comprising an interrogating border gateway control function to issue policy instructions regarding opening and closing of media paths, authorizing quality of service, and applying policies.

14. The first control node of claim 1, wherein determining whether an unauthorized action is being attempted based on checking the location of the terminal comprises checking whether a transaction initiated by the terminal originates from a visited network in which the terminal has not registered.

15. The first control node of claim 1, wherein determining whether an unauthorized action is being attempted based on checking the location of the terminal comprises determining whether access network information contained in the messaging corresponds to an expected location of the terminal.

16. A method executable in a first control node used in a first multimedia network, comprising:

performing, by a call control module in the first control node, a call control task to enable establishment of a call session in the first multimedia network on behalf of a terminal, wherein the first multimedia network has control functions to provide Internet Protocol multimedia services;

the call control module cooperating with a second control node to perform the call control task; and performing, by a security element in the first control node, a security task with respect to messaging communicated for enabling establishment of the call session wherein the security task includes checking a location of the terminal and determining whether an unauthorized action is being attempted based on checking the location of the terminal, wherein checking the location of the terminal includes at least one of:

comparing a cell identifier provided by the terminal with a cell identifier provided by an entity other than the terminal; and comparing a cell name provided by the terminal with a cell name provided by an entity other than the terminal.

17. The method of claim 16, further comprising the security element performing plural other security tasks selected from among: determining whether a required header is present in the messaging; determining whether the messaging has a correct length; removing a forbidden item in the messaging; checking for a known attack signature in the messaging; detecting a denial-of-service attack; verifying that a media address contained in the messaging belongs to the terminal; stripping a header and encrypting a header to hide an internal multimedia network infrastructure from another network; checking that excessive session establishment is being attempted by the terminal; mitigating spam messaging; and checking whether a service performed by an application server is authorized.

18. The method of claim 16, wherein determining whether an unauthorized action is being attempted based on checking the location of the terminal comprises checking whether a transaction initiated by the terminal originates from a visited network in which the terminal has not registered.

* * * * *